UNITED STATES PATENT OFFICE.

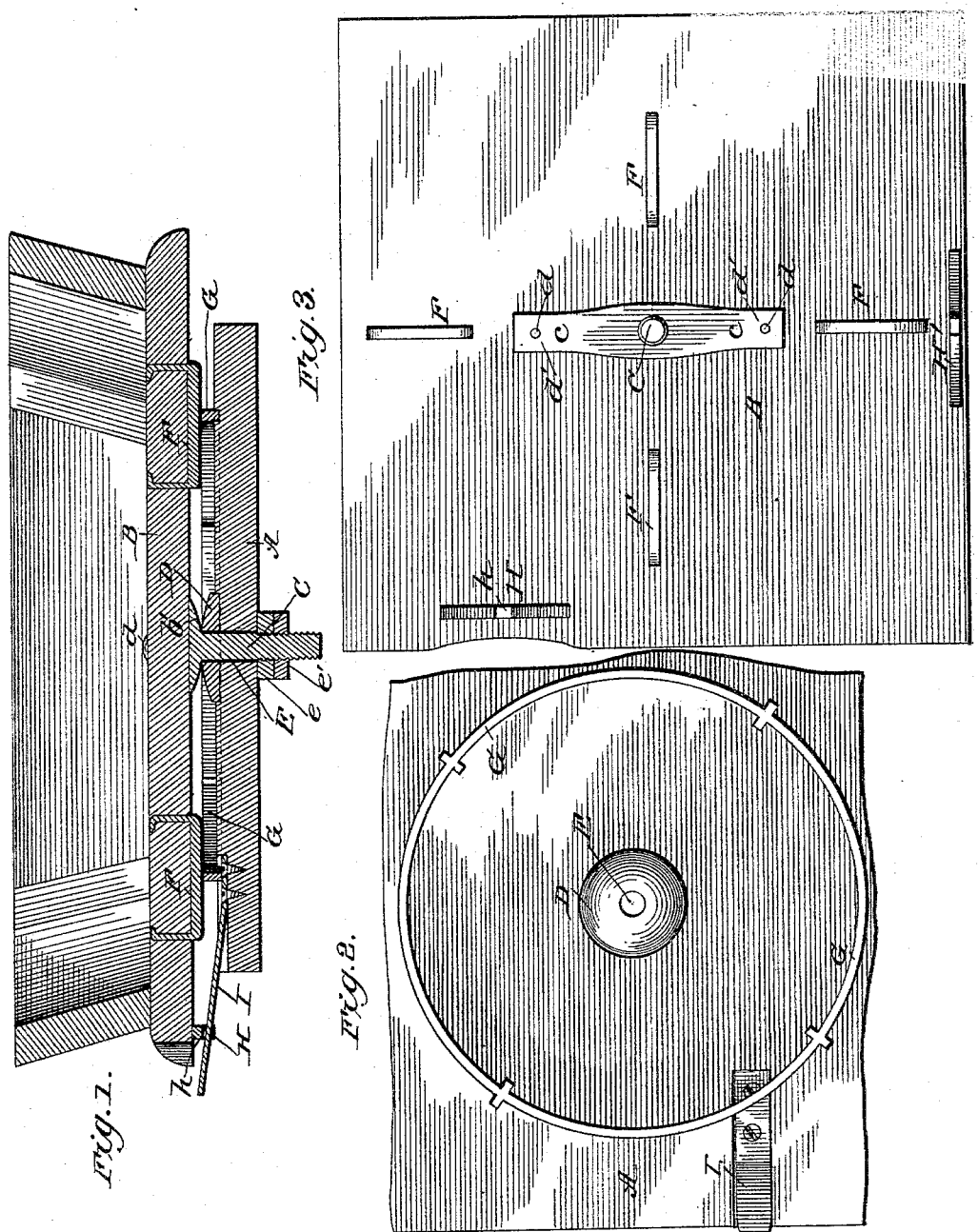

JOHN M. LEE, OF DOUGLAS, ARKANSAS.

CART-SEAT.

SPECIFICATION forming part of Letters Patent No. 411,597, dated September 24, 1889.

Application filed July 1, 1889. Serial No. 316,251. (No model.)

*To all whom it may concern:*

Be it known that I, JOHN M. LEE, residing at Douglas, in the county of Lincoln and State of Arkansas, have invented certain new and useful Improvements in Cart-Seats, of which the following is a specification.

My invention has for its object to provide a revolving cart-seat which will be simple in construction and cheap as to cost; and it consists in certain novel features of construction and combination of parts, all of which will hereinafter be fully described in the annexed specification and particularly pointed out in the claims, reference being had to the accompanying drawings, in which—

Figure 1 is a transverse section of my improved seat. Fig. 2 is a plan view of a portion of the seat-supporting frame, and Fig. 3 is an inverted plan view of the seat.

In the drawings, A indicates the seat-supporting frame, and B the seat, upon the under side of which is secured a depending pivot-bolt C, provided with lateral flanges or wings *c c*, through which and the seat-body bolts *d d* are passed, and their lower ends being provided with nuts *d' d'*, by means of which the pivot-bolt is securely held in place on the seat-body. The bolt C passes down through a central aperture E in the seat-frame, and is held in place by the nut *e* and jam-nut *e'*.

D denotes a washer disposed on the bolt between the seat and seat-frame, as shown. The washer D is provided with a convexed upper surface, upon which bears the convexed lower surface *b'* of the bolt-flange, and as the weight during revolving is on the washer and flange said flange and washer are constructed of polished iron or steel. By forming the flange and washer with convexed bearing-surfaces the friction is reduced to a minimum.

F denotes a series of metallic bearing-plates secured upon the under side of the seat B, and which engage and rest upon a circular metallic track G, secured upon the seat-supporting frame A.

H H' denote the depending notched lugs or stops secured upon the under side of the seat, as shown, and I denotes a spring-catch secured upon the supporting-frame, which is adapted to engage with either of said lugs in a manner presently described.

The stops H H' may be secured upon the seat at any point desired. As shown in the drawings, the stop H is arranged at the right side, while the stop H' is secured at the center of the rear edge of the seat. By this construction it will be seen that by pressing on the thumb-piece *i* of the spring-catch I, thereby forcing same from engagement with the notch *h* of the stop H, the seat may be turned to the left, and when same is thus turned the stop H' will come into engagement with the catch I and hold the seat in turned position. The seat may be turned entirely around by turning same to the right.

While I have shown and described my improvement in connection with cart-seats, it is manifest the same may be used in connection with other kinds of seats, such as revolving chairs, &c. It will also operate as well on double as on single seats.

From the foregoing description, taken in connection with the drawings, the operation and advantages of my invention will be clearly understood. It will be seen that the same is exceedingly simple, and by simply pressing the releasing-catch and pressing with his feet against the bottom of the cart the occupant can quickly and easily turn the same, and by arranging the washer and the flanged bolt as described all of the weight of the occupant during turning will be on said parts.

Having thus described my invention, what I claim, and desire to secure by Letters Patent, is—

1. The combination, with the seat-supporting frame provided with a central vertical aperture, of the seat B, provided with a depending bolt held in said aperture, provided with a flanged head secured to the under side of the seat, said head provided with a convexed under surface, and a washer disposed upon the bolt between the seat and seat-frame, and provided with a convexed upper surface engaging the flanged head of the bolt, substantially as and for the purpose described.

2. The combination, with the seat-frame provided with a central vertical aperture, of the seat B, provided with a depending pivot-bolt operating in said aperture E, said bolt formed with lateral wings or flanges c c, adapted to be bolted to the under side of seat B, the central portion of said flanges formed convexed on their under side, and a nut or washer disposed on said bolt between the seat and supporting-frame, provided with an upper convex surface, substantially as and for the purpose described 3. The hereinbefore-described improvement in cart-seats, consisting of a supporting-frame A, provided with a central aperture E and a spring-catch I at one side, the seat B, provided with a depending pivot-bolt operating in said aperture E, said bolt provided with a flanged head having a convex bearing-surface on its lower face, depending lugs or stops secured to said seat, adapted to engage the spring-catch I, and a washer disposed between the seat and seat-frame, provided with an upper convexed bearing-surface adapted to engage the flanged bolt-head, all arranged substantially as and for the purpose described.

4. The combination, with the supporting-frame A, provided with a central aperture E, a circular metallic track G, secured thereto, as shown, and a spring-catch I, secured to one side of said frame, of the revolving seat provided with a depending pivot-bolt operating in the aperture E, and provided with a flanged head having a convexed bearing-surface, metallic bearing-plates secured to the under side of said seat, adapted to ride upon the track G, depending stops secured to the seat, adapted to engage the spring-catch I, and a washer disposed on the bolt between the seat and supporting-frame, having a convexed bearing-surface engaging the flanged head of the bolt, all arranged substantially as and for the purpose set forth.

JOHN M. LEE.

Witnesses:
F. D. GRANGER,
B. L. KINGSLAND.